United States Patent [19]

Brunsch et al.

[11] 4,078,422
[45] Mar. 14, 1978

[54] ADJUSTING THE STATIC MOMENT OF A ROTOR BLADE

[75] Inventors: Klaus Brunsch, Weidach; Rolf Döllinger, Fischbachau, both of Germany

[73] Assignee: Messerschmitt-Bölkow-Blohm GmbH, Munich, Germany

[21] Appl. No.: 693,972

[22] Filed: Jun. 8, 1976

[30] Foreign Application Priority Data

Jun. 24, 1975 Germany .............................. 2528007

[51] Int. Cl.² .................... G01M 1/12; G01M 1/32
[52] U.S. Cl. ............................... 73/65; 73/456; 416/61
[58] Field of Search ................. 73/455, 456, 65, 66, 73/468; 29/156.8 B; 416/61, 144; 74/573 R, 573 F

[56] References Cited

U.S. PATENT DOCUMENTS

| | | | |
|---|---|---|---|
| 1,209,730 | 12/1916 | Leblanc | 74/573 F |
| 1,385,802 | 7/1921 | St. John | 416/144 |
| 2,203,782 | 6/1940 | Hem | 73/456 |
| 2,430,702 | 11/1947 | Bohannan | 73/65 |
| 2,937,613 | 5/1960 | Larsh | 73/66 X |
| 3,939,020 | 2/1976 | Carmanian et al. | 74/573 R X |

*Primary Examiner*—James J. Gill
*Attorney, Agent, or Firm*—Toren, McGeady and Stanger

[57] ABSTRACT

In finishing the construction of a rotary wing, particularly helicopter rotor blade, the blade is weighed to determine the position of its static moment. The measured value is compared with a predetermined value and, if necessary, the static moment is adjusted by applying a high specific gravity filler material to the surface of the blade. The filler material has a specific gravity in a range of 6 to 10 p/cm³ and can be formed of a mixture of tungsten powder and epoxy resin. The weighing operation is performed on a three scale apparatus with one scale supporting the end of the blade attached to the rotor and the other two scales supporting the opposite end of the blade.

10 Claims, 2 Drawing Figures

ADJUSTING THE STATIC MOMENT OF A ROTOR BLADE

SUMMARY OF THE INVENTION

The present invention is directed to the adjustment of the static moment in a rotary wing, particularly in a helicopter rotor blade.

Accurate maintenance of the static moment of support surfaces is of critical importance for rotating support surfaces, and particularly for the main rotor blades of helicopters. Further such maintenance of the aerodynamic behavior and smooth running of the rotating support surfaces is also important. To assure complete individual interchangeability of the rotor blades it is not sufficient merely to balance the blades of one set, rather during manufacture or construction each blade must be balanced or adjusted to the same desired value with regard to its static moment and weight.

It is well known to insert small weights into a trimming chamber in the tip of a blade for correcting the location of the center of gravity and also the total weight of the blade. However, such a method is unsatisfactory because compensation or adjustment by adding weights is not always adequate because of blade manufacturing tolerances and also because only a lumped distribution of the adjusting mass is obtainable.

To achieve a more refined adjusting or compensating technique for redistributing the weight of rotor blades and for providing individual interchangeability of the blades it has been known to move the center of gravity of the individual rotor blades to the desired position by the application of varnish in certain amounts and at particular locations. As the varnish dries and its solvent evaporates, a weight reduction of the compensating mass results and if there is a considerable difference between the measured value and the predetermined value which must be met, a large number of layers of varnish must be applied.

In accordance with the present invention, a process for adjusting the static moment has been devised which permits a simple and exact adjustment technique even if there are considerable differences between the actual and the desired values. Further, by providing such exact adjustments it is possible to provide individual interchangeability of the rotor blades.

Therefore, the problem of adjusting the static moment is accomplished by determiing the difference between the actual and predetermined values and by applying a filler material having a high specific weight to the surface of the blade for the exact adjustment of the static moment.

By use of the invention, the adjustment of the static moment of rotor blades can be accomplished at a small expenditure of energy by appropriately distributing the compensating mass on the surfaces of the blade during the curing operation. The application of the adjusting or compensating mass takes place essentially without any weight loss. Due to the high specific weight of the filler material, the thickness of the applied layer is very small, preferably about 0.1 mm, even for large differences from the desired or predetermined value which result because of the manufacturing process or tolerances, and any changes in the blade profile due to the filler material does not disturb its aerodynamic behavior.

Preferably, filler material has a specific gravity between 6 and 10 p/cm$^3$, and a particularly advantageous filler material with regard to its strength and specific gravity is obtained from a paste-like mixture of tungsten powder and epoxy resin with the tungsten powder having a preferred grain size not exceeding 5 μm.

The static moment of a rotatable blade in its lengthwise direction is the determining characteristic magnitude for an even vibration-free rotation of the rotor, and a particularly simple correction of this characteristic magnitude is obtained by determining the static moment in the blade's longitudinal direction and establishing the dimensions of the area covered by the filler material from the deviation of the static moment from a predetermined desired value. A further refinement of the adjustment technique is possible by additionally determining the static moment in the direction of the blade's depth or chordal dimension, that is transversely of its longitudinal dimension, and then determining the dimensions of the area covered by the filler material in both the longitudinal direction of the blade as well as in its depth or chordal direction.

The required mass of the filler material for obtaining a specified weight for the rotor blade is preferably established after weighing the blade, so that, in addition to the correction of the static moment, any weight difference can also be compensated, since this is particularly necessary to assure individual interchangeability of the rotor blades. In a particularly simple process for determining the required application of the filler material, it is recommended that an untreated rotor blade be weighed in a three point weighing apparatus and that the quantity and surface area of the filler material be determined based on the differences between the predetermined desired values and the values determined at the three weighing locations.

The inventive method is particularly applicable for the lifting surfaces in the form of helicopter rotor blades. An apparatus useful in carrying out the process includes a three point weighing apparatus consisting of three scales with one having a mounting support for the base of the blade and with a cross beam extending between the other two scales for supporting the other end of the blade.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
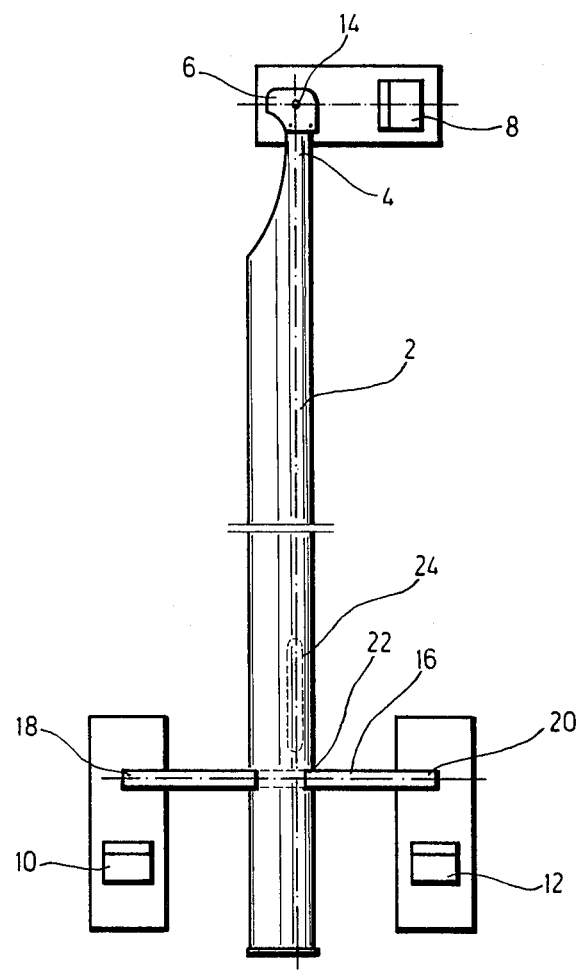
FIG. 1 is a plan view of a rotor blade and an apparatus for determining the weight and static moment of the blade in both its longitudinal and chordal directions.

In FIG. 1 a main rotor blade 2 formed of a synthetic plastic material is shown with a metal fitting 6 located at one end which serves for securing the blade to a rotor head. The fitting 6 is screwed onto the end or base 4 of the blade. To adjust the static moment in the longitudinal and chordal directions of the blade and to also adjust its weight, the untreated rotor blade 2 is weighed in a three point weighing apparatus consisting of three scales 8, 10 and 12. A mounting support 14 is located on the scale 8 and holds the metal fitting 6 located at the base of the blade. The other two scales 10, 12 are spaced longitudinally of the blade from the scale 8 and are spaced on opposite sides of the blade so that the connecting line between them forms the base of an isosceles triangle whose apex is located at the scale 8. The opposite end of the blade 2 from its base 4 is supported on a cross beam 16 which, in turn, rests at its opposite ends 18, 20 on the scales 10, 12. The rotor blade 2 is detachably connected to the cross beam 16 by a blade holder 22 which has a profile matching that of the blade.

The predetermined desired value indications for the three scales 8, 10 and 12 are specified by the desired weight and desired static moment in the longitudinal and chordal directions of the blade. The quantity or weight of the paste-like filler material as well as the area to be applied to the surface of the blade with reference to a specified thickness of the filler material layer of approximately 0.1 mm, are determined by calculation involving the deviation of the actual values measured from the predetermined values. The actual values being those determined on the scales 8, 10 and 12. That is, the difference between the predetermined desired blade weight and the sum of the indicated values of scales 8, 10, 12 represents the weight of the filler material to be applied. The sum of the indicated values of scales 10 and 12, multiplied with the distance (inches) of the cross beam 16 from the support 14 represents, as well known, the actual static moment of the untreated rotor blade in the longitudinal direction of the blade.

The distance, in said longitudinal direction, of the center of the area 24 to be covered by the filler material, from the support 14 is the difference defined by between the predetermined desired static moment and said actual static moment divided by the above determined weight of the filler material to be applied. In similar manner, the distance of the area 24 to be covered by filler material, from the longitudinal axis of the blade is calculated from the actual and the predetermined desired values of the static moment in the chordal direction of the blade.

Thus, the position of the center of area 24 is determined, and starting from this center position, the calculated quantity of filler material is applied in an uniform thickness of approximately 0.1 mm. After the filler material is applied in said manner over the area 24, note FIG. 1, the blade is again weighed in the three point weighing apparatus and, if necessary, readjustment is provided. Since the filler material is completely free of solvent such readjustment can take place prior to polymerization, that is, hardening or curing of the filler material.

A particularly favorable and advantageous example of a filler material having both a high strength and a high specific gravity consists of a mixture of 100 parts of epoxy resin by weight with 35 parts of hardener by weight, these parts are then thoroughly mixed together so as to be free of any streaks. Next, tungsten powder in the range of 85 to 95% by weight and having a grain size not exceeding 5 $\mu$m is mixed in. The epoxy resin used should have the lowest possible viscosity at room temperature to permit the highest possible additive share of tungsten powder for affording a high specific gravity of the filler material.

Figure 2:
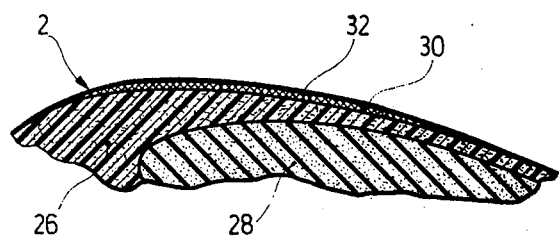
FIG. 2 is a partial cross-sectional view of the blade shown in FIG. 1 and indicating the application of the filler material.

In FIG. 2 a partial cross-section of the rotor blade is shown after the filler material has been applied. The blade 2 consists of a foam-material core 28 surrounded or covered by a fiber glass reinforced synthetic material layer 26. The filler material layer, as determined by the weighing apparatus 8, 10 and 12, is applied to the partial area 24 of the blade and for clarity's sake the thickness of the layer has been exaggerated, however, in actual use the layer has a thickness of approximately only 0.1 mm. After making the necessary adjustment, the rotor blade 2, including the applied layer 30 of filler material, is coated in a conventional manner with a polyurethane varnish layer 32.

To insure that the filler material layer 30 is not removed from the rotor blade during any repair operations, the material is specially colored.

What is claimed is:

1. Method for adjusting the weight and static moment of a rotor blade, such as used on a helicopter, comprising the steps of supporting the rotor blades in at least two positions spaced apart in the longitudinal direction of the blade, measuring the weight of the blade at the at least two support positions, determining the actual static moment of the rotor blade based on the measured weights, determining the diffference in magnitude of the measured weights and the determined static moment from predetermined desired values for weight measurements and the static moment, and applying a high specific gravity paste-like filler material onto the surface of the rotary blade in quantity and position precalculated from the difference in magnitude between the measured and the predermined values for adjusting the determined weight measurements and static moment to the predetermined value thereof.

2. Method, as set forth in claim 1, wherein the filler material has a specific gravity in the range of 6 to 10.

3. Method, as set forth in claim 2, wherein the filler material comprises a mixture of tungsten powder and epoxy resin.

4. Method, as set forth in claim 3, wherein the tungsten powder has a grain size not exceeding 5 $\mu$m.

5. Method, as set forth in claim 4, comprising applying the filler material in a thickness of approximately 0.1 mm.

6. Method, as set forth in claim 5, comprising determining the static moment using the measured weights for establishing the static moment in the longitudinal direction and in the chordal direction of the blade and dimensioning the application of the filler material by comparing the measured values of the static moment with the predetermined values.

7. Method, as set forth in claim 6 comprising measuring the weight of the untreated blade in the untreated condition.

8. Method for adjusting the static moment of a rotor blade, such as used on a helicopter, comprising the steps of measuring the actual static moment of the rotor blade, determining the deviation of measured static moment from a predetermined value from the static moment, applying a high specific gravity paste-like filler material onto the surface of the rotary blade in quantity and position precalculated from the deviation between the measured and the predetermined values for adjusting the determined static moment to the predetermined value and including the steps of weighing the blade in the untreated position by measuring the weight at three spaced locations, comparing the three measured weights with the predetermined values for the three spaced weighing locations for determining the quantity and area of the filler material to be applied to the blade.

9. An apparatus for weighing an elongated rotor blade having a first end and a second end with the first end arranged for attachment to a rotor, comprising a three point weighing apparatus including a first scale, a second scale and a third scale, said first scale being spaced from said second and third scales so that said first scale is positioned to weigh the first end of the rotor blade and said second and third scales are spaced opposite one another so that the second end of the blade is positioned between them in the weighing position, means for fixing the rotor blade on the apparatus including a mounting support positioned on said first scale for supporting the first end of the blade, and cross beam extending between and positioned on said second and third scales for supporting the second end of the blade, said scales being positioned so that connecting lines extending therebetween form an isosceles triangle with the base formed by the connecting line between the said second and third scales and the altitude formed by a line perpendicular to the base and passing through the connection on said first scale for the first end of the rotor blade.

10. An apparatus for weighing an elongated rotor blade having a first end and a second end with the first end arranged for attachment to a rotor, comprising a three point weighing apparatus including a first scale, a second scale and a third scale, said first scale being spaced from said second and third scales so that said first scale is positioned to weigh the first end of the rotor blade and said second and third scales are spaced opposite one another so that the second end of the blade is positioned between them in the weighing position, means for fixing the rotor blade on the apparatus including a mounting support positioned on said first scale for supporting the first end of the blade, and cross beam extending between and positioned on said second and third scales for supporting the second end of the blade, said scales being positioned so that connecting lines extending therebetween form a triangle with the base formed by the connecting line between the said second and third scales and the altitude formed by a line perpendicular to the base and passing through the connection on said first scale for the first end of the rotor blade.

* * * * *